Dec. 19, 1933.  C. R. MEITZLER  1,939,713
STERILIZER
Filed Aug. 28, 1930  8 Sheets-Sheet 1

Inventor
Charles R. Meitzler
By Brown, Jackson, Boettcher & Dienner
Attys

Dec. 19, 1933.   C. R. MEITZLER   1,939,713
STERILIZER
Filed Aug. 28, 1930   8 Sheets-Sheet 2

Inventor
Charles R. Meitzler
By Brown, Jackson, Boettcher & Dienner.
Att'ys.

Dec. 19, 1933.  C. R. MEITZLER  1,939,713
STERILIZER
Filed Aug. 28, 1930  8 Sheets-Sheet 3
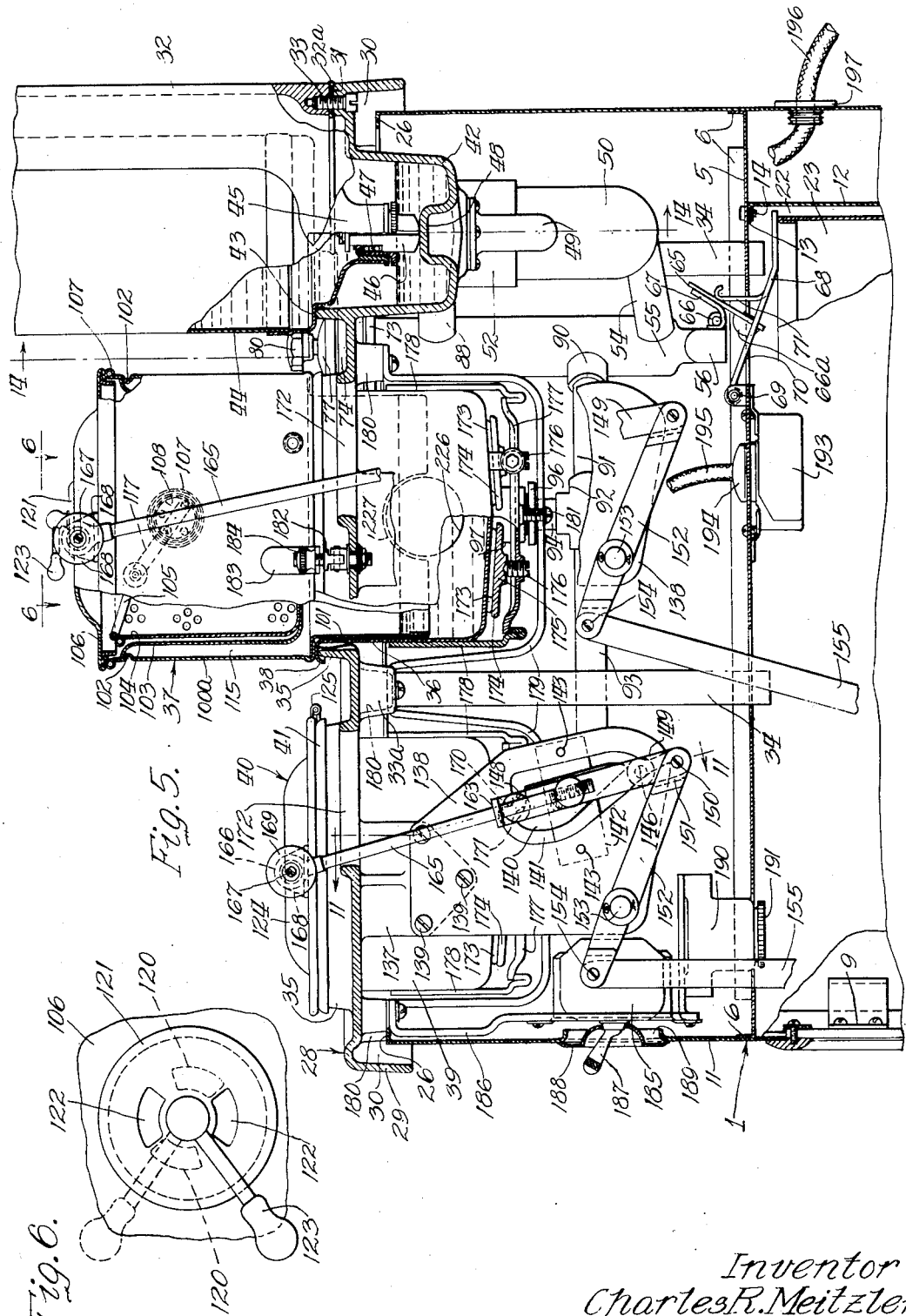
Inventor
Charles R. Meitzler
By Brown, Jackson, Boettcher & Dienner
Attys.

Dec. 19, 1933.   C. R. MEITZLER   1,939,713
STERILIZER
Filed Aug. 28, 1930   8 Sheets-Sheet 4
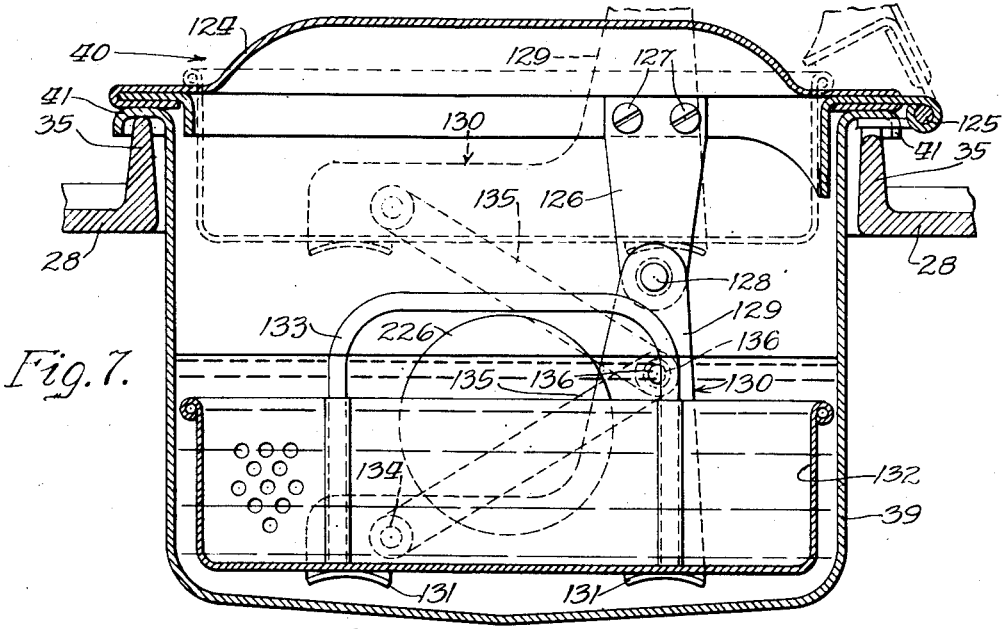
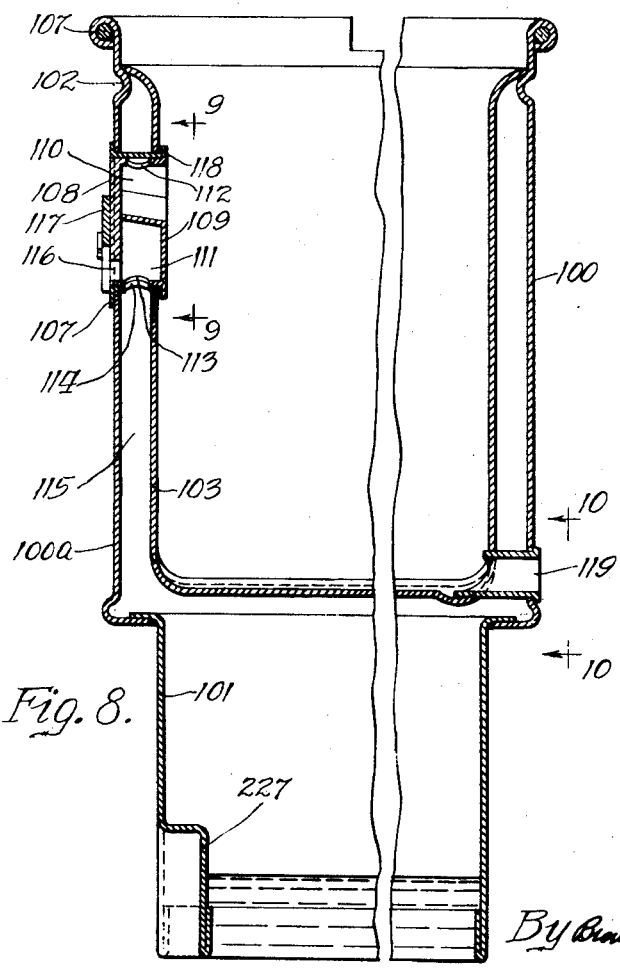
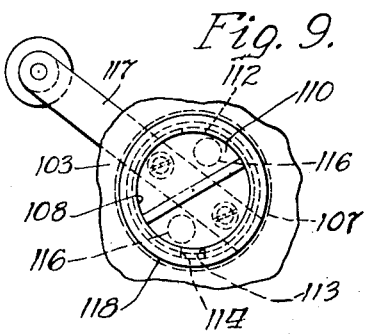
Inventor
Charles R. Meitzler Dec. 19, 1933.   C. R. MEITZLER   1,939,713
STERILIZER
Filed Aug. 28, 1930   8 Sheets-Sheet 5
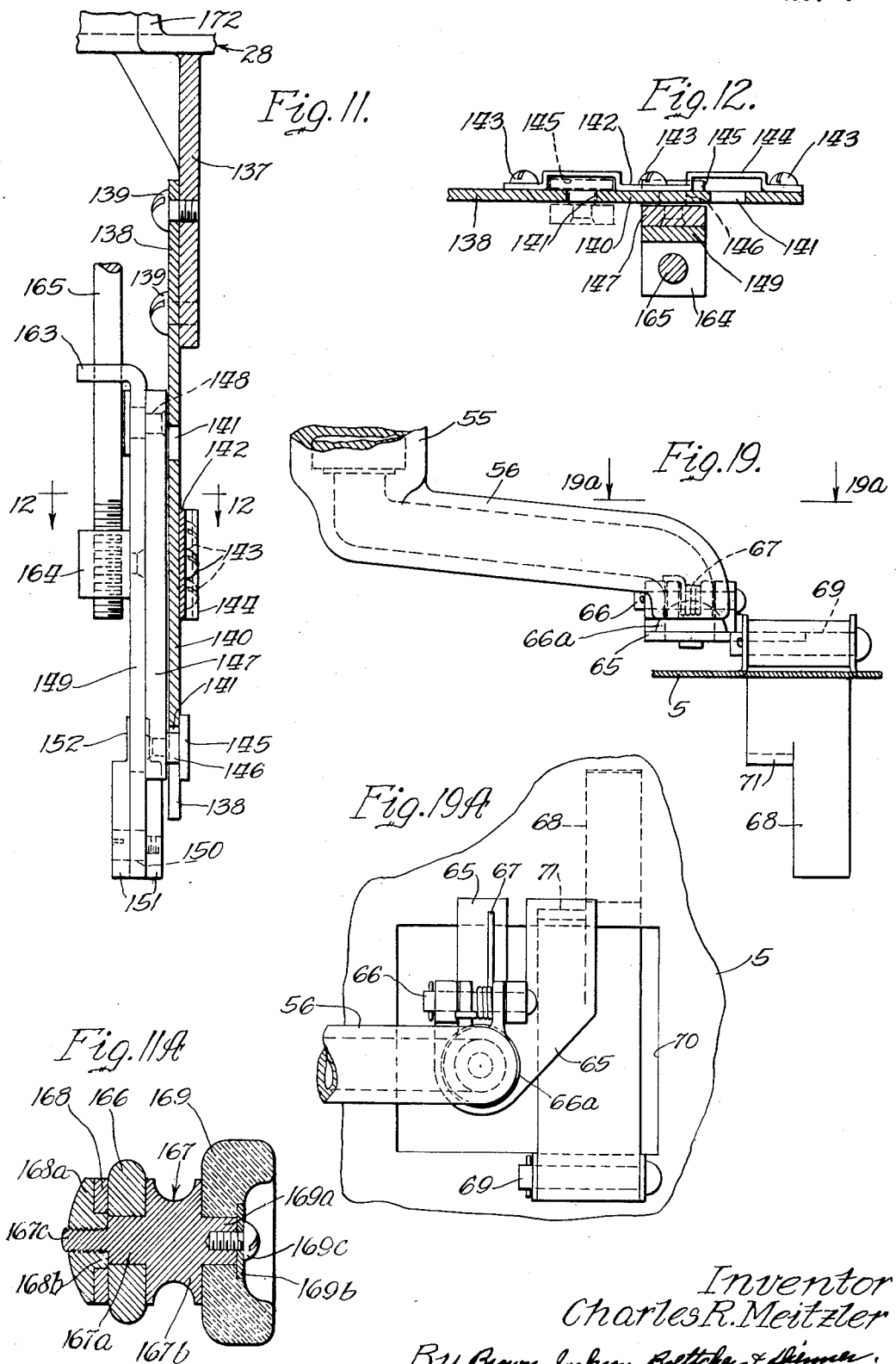
Inventor
Charles R. Meitzler
By Brown, Jackson, Boettcher & Dienner
Att'ys Dec. 19, 1933.    C. R. MEITZLER    1,939,713
STERILIZER
Filed Aug. 28, 1930    8 Sheets-Sheet 6

Inventor
Charles R. Meitzler
By Brown, Jackson, Boettcher & Dienner
Att'ys

Dec. 19, 1933.　　　　C. R. MEITZLER　　　　1,939,713
STERILIZER
Filed Aug. 28, 1930　　　8 Sheets-Sheet 7

Inventor
Charles R. Meitzler
By Brown, Jackson, Boettcher & Dienner.
Att'ys

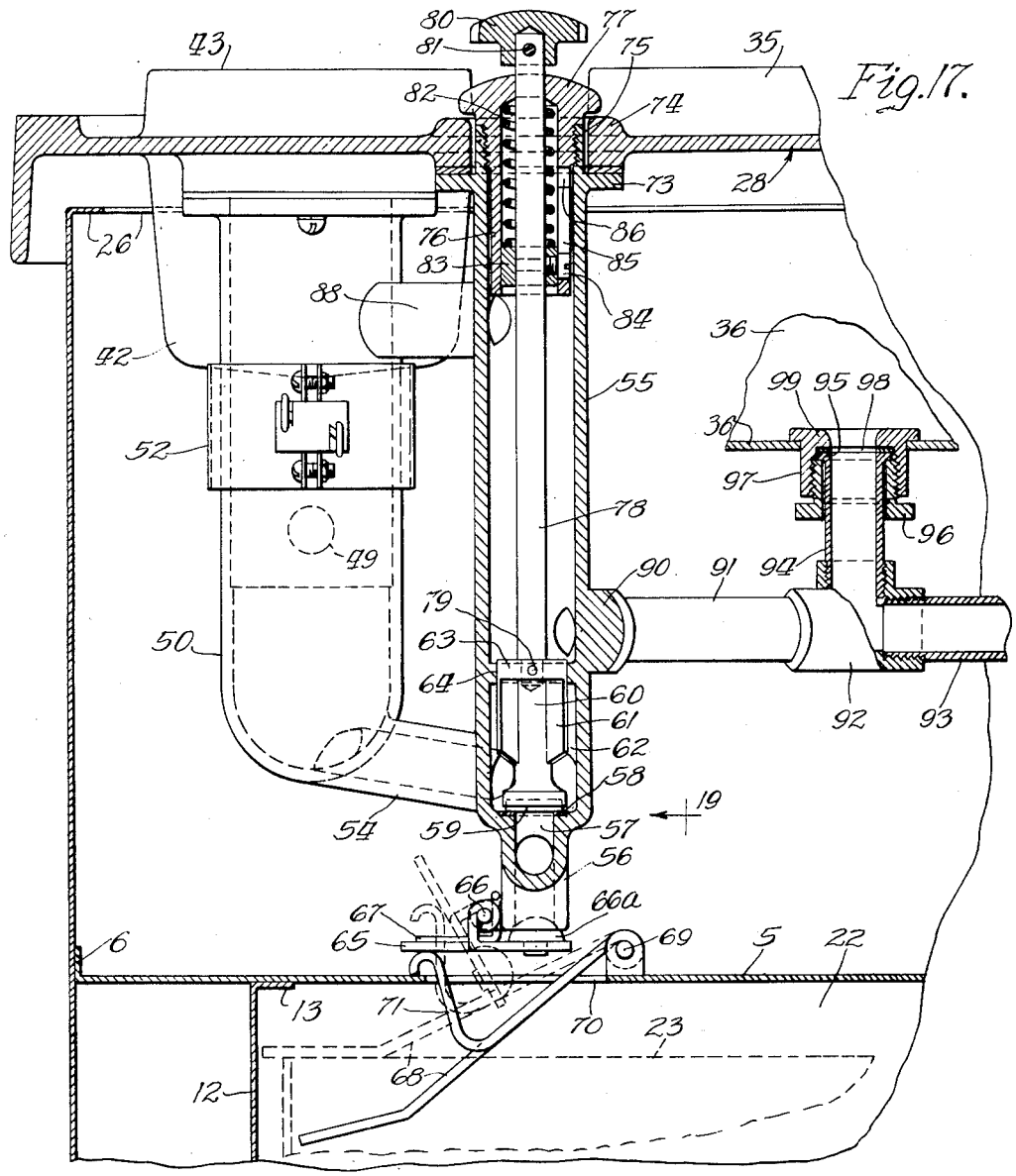

Patented Dec. 19, 1933

1,939,713

UNITED STATES PATENT OFFICE 1,939,713

STERILIZER

Charles R. Meitzler, Rochester, N. Y., assignor to Oscar H. Pieper and Alphonse F. Pieper, both of Rochester, N. Y.

Application August 28, 1930. Serial No. 478,338

13 Claims. (Cl. 167—3)

This invention relates to sterilizers, and more particularly to a sterilizing apparatus to be used in dental offices and similar places.

In sterilizers of present type which are commonly used in dental offices, no provision is made for supplying water to the sterilizers and this renders it necessary for the dentist to pour into the sterilizer tank, from time to time, a sufficient quantity of water for sterilizing the instruments, towels, dressings and other articles to be sterilized. The water in the sterilizer is heated to or above boiling temperature so that the available supply of water in the tank is rapidly reduced when the sterilizer is in active service for an appreciable length of time. It is obviously impracticable for the dentist to be continuously replenishing the water in the tank and, to avoid such necessity, it is the common practice to pour into the tank a much greater quantity of water than is necessary for the sterilizing operation, the tank being commonly filled to within a short distance of its top. This renders it necessary, when sterilizing instruments or other articles, to heat a much greater volume of water than is actually necessary for the sterilizing operation. As a result a great deal of heat is wasted and much time is lost.

In the event that the dentist fails to fill the sterilizer tank at frequent intervals, there is the possibility that all of the water will be evaporated from out of the tank with the result that the parts of the tank which are soldered together are apt to be heated to such a high temperature as to become unsoldered, rendering the sterilizer useless. When this occurs, a great loss of time and inconvenience, as well as the expense due to the injury to the sterilizer, results. The possibility, therefore, of the water becoming exhausted from the sterilizer is a source of annoyance and worry to the dentist.

A further objection to sterilizers of present type is that, as the water is evaporated, foreign materials contained in the water, such as calcium, magnesium, and other minerals, are deposited upon the walls of the tank and form a crust thereon. The sterilizer tank becomes coated with a crust, after it has been in use for a short time, rendering it inefficient and unfit for use. This incurs a further loss of time in cleaning the tank and, when the tank is not cleaned frequently, the crust formed therein acts as a heat insulator and greatly reduces the efficiency of the tank resulting in an objectionable increase in heat consumed for heating the water.

I have found that the various objections noted above to the present type of sterilizer can be avoided by providing means for automatically supplying water to the sterilizing tank at a constant level therein, this level being that required for the most efficient operation of the sterilizer. In conjunction with the means for supplying water to the sterilizing tank, I also provide means controlled by the water level therein for rendering the heating means inoperative in the event of the water level in the sterilizing tank falling below a predetermined low level. This effectively eliminates the possibility of injury to the sterilizing tank by heating thereof after the water in the tank has been exhausted, or substantially so. By maintaining the water in the tank at a constant level, I assure that the volume of water in the tank is maintained constant.

The heating means is composed of primary and supplemental elements of sufficient combined capacity to raise the constant volume of water from an approximate room temperature to a boiling temperature in a pre-determined minimum length of time, at which time, the supplemental element is automatically disabled with the remaining primary element of sufficient capacity to maintain this constant volume of water at a boiling temperature. But should the temperature of this constant volume of water drop to a pre-determined point due to a chilling, the supplemental element is automatically energized to raise the temperature quickly to boiling, at which time the supplemental element is again automatically disabled.

The range between the minimum temperature and the maximum temperature for the water is comparatively narrow giving an automatic control which assures almost a constant boil for sterilizing purposes.

A further object of my invention is to provide means for conditioning the water before it enters the sterilizing tank. This conditioning means acts to pre-sterilize the water and also serves to separate from the water mineral substances, such as calcium, magnesium, and other minerals which would tend to collect upon the walls of the tank so as to form a crust and reduce the efficiency of the sterilizer.

Further objects and advantages of my invention will appear from the detail description.

In the drawings:—

Figure 5 is a fragmentary vertical sectional view taken through the upper portion of the cabinet and the sterilizing apparatus, parts being shown in elevation;

Figure 6 is a detail of the vent control valve for the cover of the dressing sterilizer, taken substantially on line 6—6 of Figure 5;

Figure 7 is a transverse vertical sectional view through the instrument sterilizer and the adjacent portion of the supporting plate;

Figure 8 is a vertical sectional view taken through the dressing sterilizer lengthwise thereof;

Figure 9 is a detail of the steam flow control valve of the dressing sterilizer, this view being taken substantially on line 9—9 of Figure 8;

Figure 10 is a detail of the steam outlet tube of the dressing sterilizer, taken substantially on line 10—10 of Figure 8;

Figure 11 is a section, on an enlarged scale, taken substantially on line 11—11 of Figure 5;

Figure 11A is a section, on an enlarged scale, taken substantially on line 11a—11a of Figure 2;

Figure 12 is a section taken substantially on line 12—12 of Figure 11;

Figure 17 is a section taken substantially on line 17—17 of Figure 13;

Figure 18 is a detail of the bushing and associated parts fitting into the upper end of the drain valve casing;

Figure 19 is a section taken substantially on line 19—19 of Figure 17;

Figure 19A is a view taken substantially on line 19a—19a of Figure 19;

Figures 1, 2:
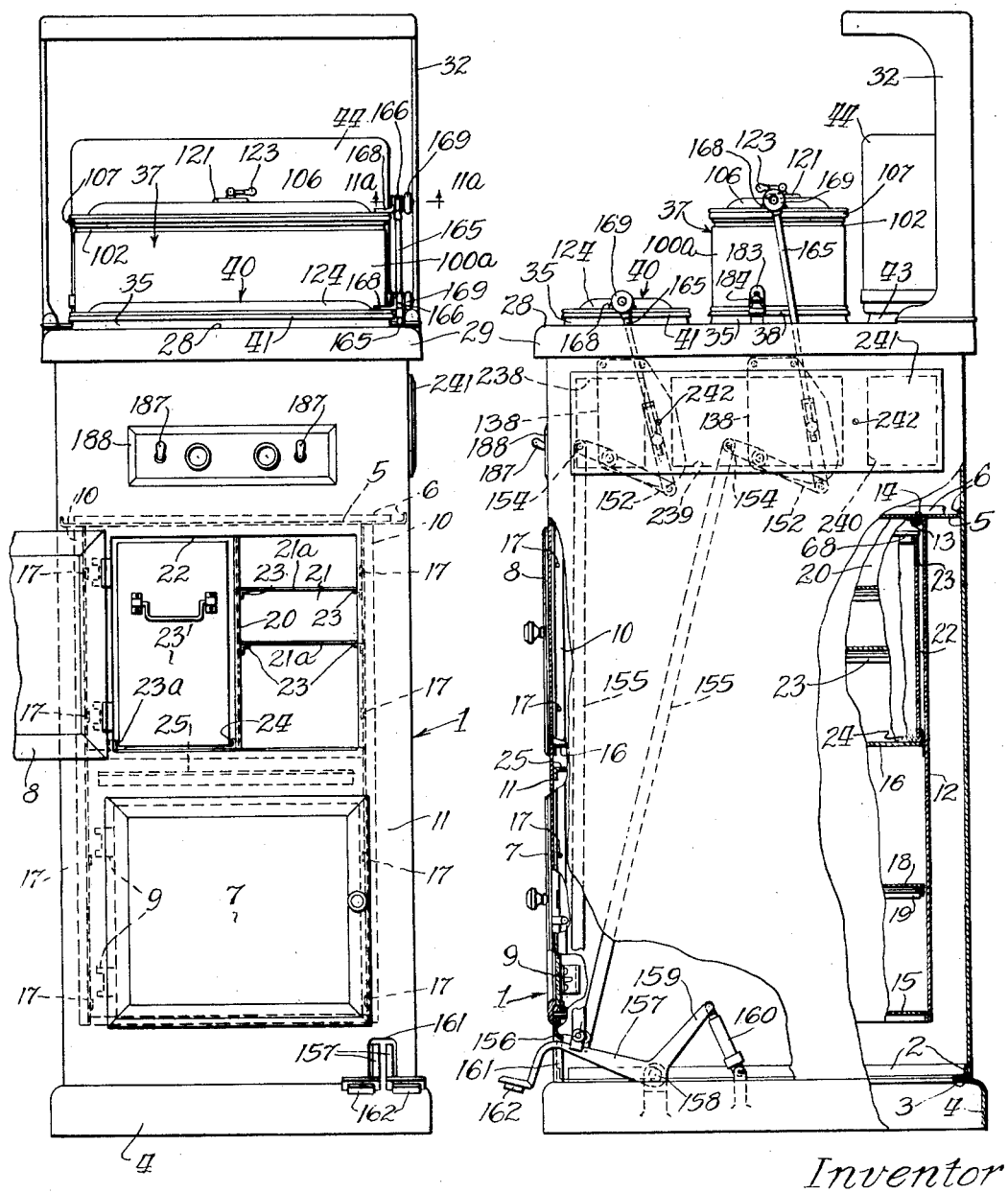
Figure 1 is a side view, partly broken away and in section, of a sterilizing apparatus mounted upon a supporting cabinet, in accordance with my invention.
Figure 2 is a front view of the cabinet and the sterilizing apparatus, with the upper door open.

The sterilizing apparatus preferably is mounted in the top of a stand in the form of a cabinet. This cabinet comprises a box-like, sheet metal casing 1, about the lower end of which extends a reinforcing angle strip 2, which is suitably secured, as by means of screws 3, to a cast base 4. A sheet metal partition 5 is suitably secured within cabinet 1, a short distance from the top thereof, and extends throughout the entire cross-area of the cabinet. This partition member 5 is provided with securing flanges 6 which are secured in a suitable manner, as by spot-welding, to the walls of cabinet 1. The front wall of cabinet 1 is provided with openings therethrough and suitable doors 7 and 8 are provided for closing such openings, these doors being attached to the front wall by means of concealed hinges 9. Angle strips 10 are suitably secured, as by spot-welding, to the inner face of front wall 11 of the cabinet, at opposite sides of the door openings, and extend from partition 5 to within a short distance of the lower end of the cabinet. An inner cabinet 12, also formed of sheet metal and of box-like construction, is disposed within the outer cabinet 1. At its upper end, this inner cabinet is provided with inturned flanges 13 which are secured in a suitable manner, as by screws 14, to partition 5. The lower end of the inner cabinet is closed by a bottom plate 15 and the interior of this cabinet is divided into an upper compartment and a lower compartment by a partition 16. The inner cabinet 12 is open at its front and fits between the inwardly projecting flanges of the angle strips 10, to which the side walls of the cabinet 12 are secured in a suitable manner, as by screws 17. A shelf 18 is supported by angle strips 19 within the cabinet 12, this shelf and the bottom plate 15 serving to support articles disposed within this cabinet. The lower door 7 gives access to the lower compartment of the inner cabinet. The upper compartment of the inner cabinet 12 is divided, by a vertical partition 20, into two compartments 21 and 22. Suitably disposed angle strips 23 are secured to the walls of compartment 21, in a suitable manner, as by spot-welding, and are adapted to support shelves 21a which provide convenient means for supporting the instrument sterilizing pan and the dressing sterilizing basket, there preferably being an extra basket and pan for use with the sterilizing apparatus. Compartment 22 is adapted for reception of a drain pan 23' which slides in angle strips 23a and 24 which rest upon partition 16. Strip 23a is suitably secured to partition 16, and strip 24 is suitably secured to partition 16 and the vertical partition 20.

Constructing the cabinet in the manner illustrated and described is advantageous, as facilitating assembly thereof while producing a rigid and strong structure. The main cabinet is first constructed, after which the inner cabinet is slid into the main cabinet through the lower end thereof and is secured to the partition 5 and to the angle strips 10 in the manner described. The inner surface of the inner cabinet is preferably covered with a coating of white enamel so as to render the same clean and sanitary. Preferably, an angle strip 25 is secured to the inner face of front wall 11 of the main cabinet, between the doors, for imparting strength and rigidity thereto.

Figure 3:
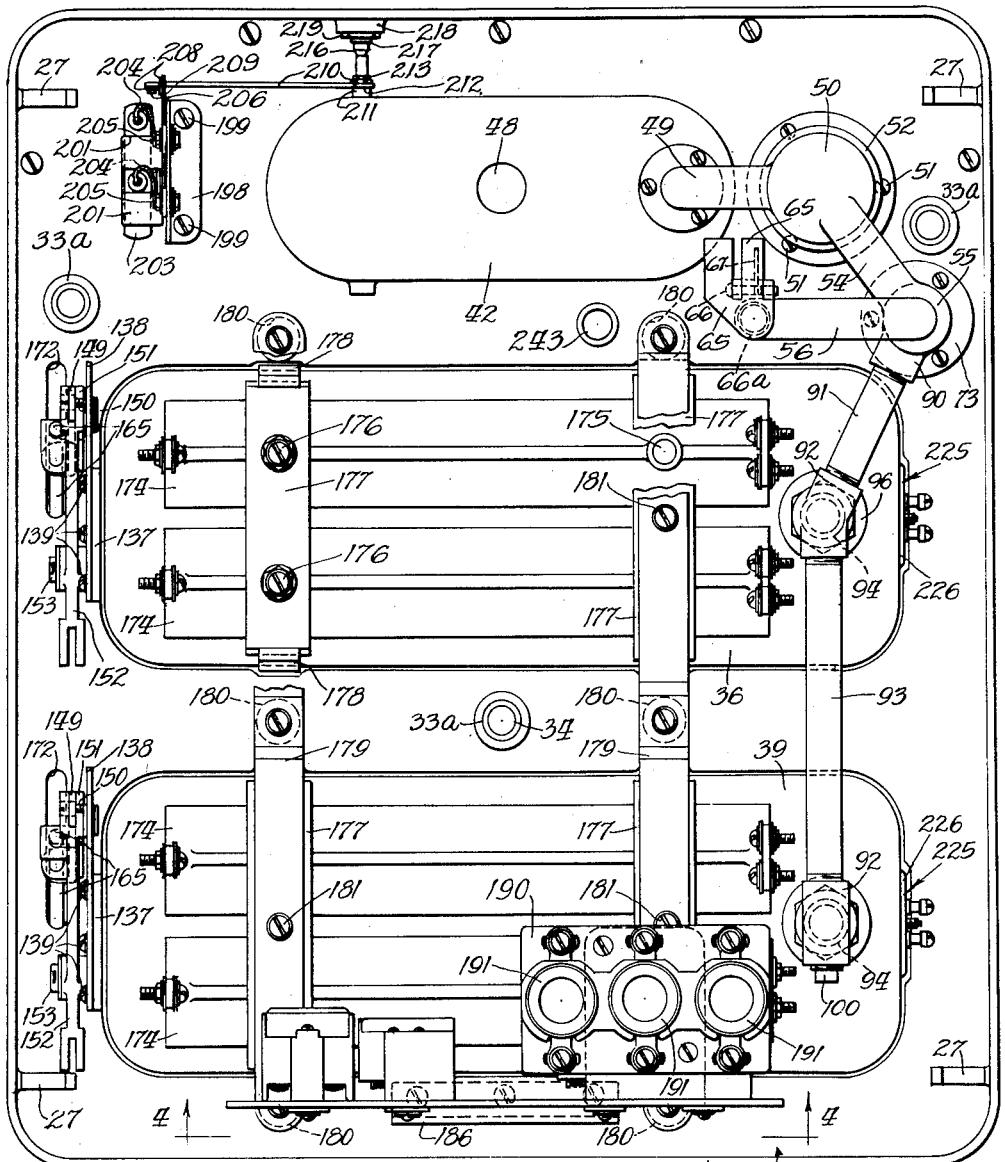
Figure 3 is an underneath view of the sterilizing apparatus assembly.
Figure 13:
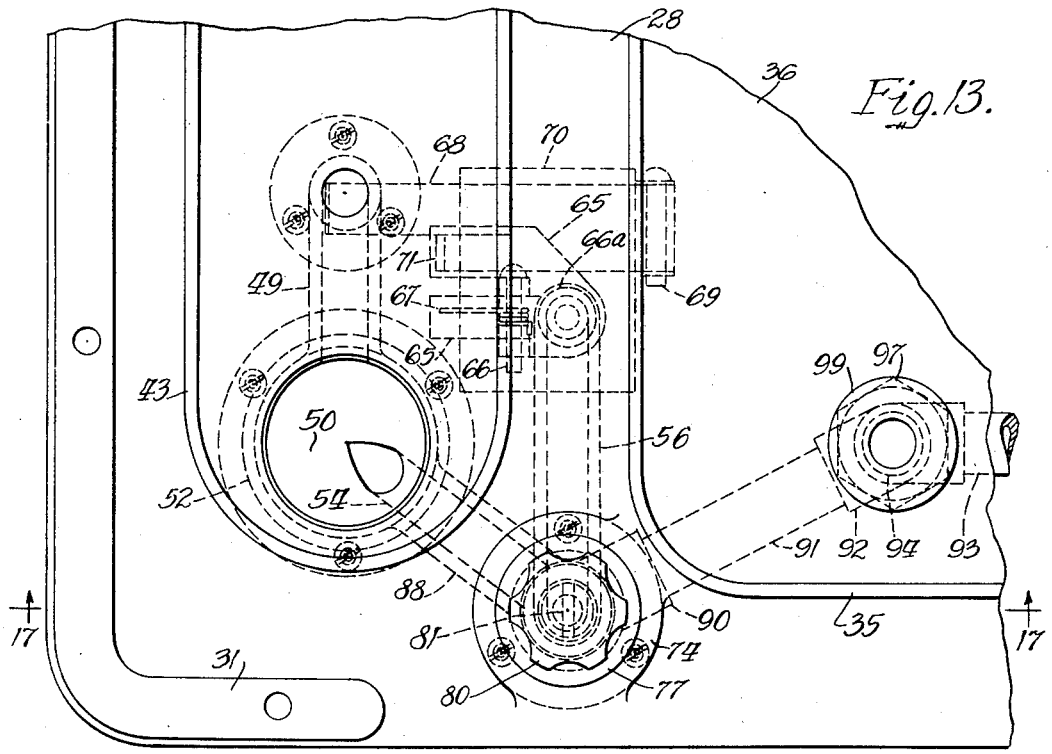
Figure 13 is a fragmentary plan view of the water reservoir and the top plate and associated parts.

At its upper end, the main cabinet 1 is provided with an inturned peripheral flange 26. This flange provides a seat for suitably disposed lugs 27 (Fig. 3) of a cast top plate 28 which seats upon the top of the cabinet. This plate is provided with a depending peripheral flange 29 disposed outwardly beyond the cabinet, and the plate is held in place above the top of the cabinet by the lugs 27, to provide a space 30 for circulation of air through the upper portion of the cabinet. The plate 28 is provided, at the rearward portion thereof, with a seat 31 (Fig. 13) extending along the back of the plate and a short distance along each side thereof. This seat receives a bracket shelf 32 mounted thereon and secured to the top plate by screws 33, or in any other suitable manner. A steam and moisture proof gasket 32a, of known type, is disposed between seat 31 and bracket shelf 32. This gasket protects the finish of the plate and the bracket shelf during assembly thereof. The bracket shelf 32 is of advantage as providing protection for a wall against which the back of the cabinet may be disposed, this shelf serving to prevent condensation upon the wall of steam generated in the use of the sterilizer.

The plate 28 is provided, on the under face thereof, with suitably disposed depending bosses 33a in which are suitably secured legs 34 disposed to support the plate above a suitable supporting means, when this plate and the parts carried thereby are removed from the cabinet. Plate 28 is further provided with two openings defined by upwardly extending flanges 35. One of these openings receives a sheet metal tank 36 of a dressing sterilizer 37, this tank being provided at its upper edge with an outwardly extending peripheral flange 38 which engages over flange 35. The other opening receives a sheet metal tank 39 of an instrument sterilizer 40, such tank having a flange 41 at its upper edge which engages over the flange 35. A water reservoir 42 is formed integrally with and depends from the plate 28 adjacent the back thereof, this reservoir extending upwardly beyond the plate to provide a flange 43. A suitably shaped water container 44 seats upon the flange 43 and is provided with a neck 45 extending downwardly into the reservoir 42. The outlet of neck 45 is controlled by a suitable valve 46 mounted therein in a suitable manner, this valve being urged in closing direction by a spring 47. When the container 44 is in position upon the flange 43, as in Fig. 5, valve 46 rests upon a boss 48 extending upwardly from the bottom of reservoir 42 and is held in open position. This permits water to flow from the container 44 into the reservoir 42 until the neck is sealed by such water, at which time the water flow stops. In this manner, the water in the reservoir 42 is maintained at a predetermined level therein.

The reservoir 42 is provided with an outlet opening which is connected by an elbow 49 to a cup 50, the elbow opening into this cup an appreciable distance above the lower end thereof. Cup 50 is suitably secured, at its upper end, to the under face of plate 28 and registers with an opening 51 extending through the plate and beneath the container 44. A suitable heating device 52, preferably an electrical heater, is disposed about the cup 50 above elbow 49. This heating device is of proper capacity to heat the water in the cup 50 to approximately 200° F. This heating of the water serves to sterilize it and also serves to cause deposition in the lower portion of the cup of calcium, magnesium and other mineral substances frequently contained in water. These substances thus deposited collect in the lower portion of the cup in a light, flocculent mass, as indicated at 53. Since the heating device 52 is disposed well above the lower portion of the cup, such lower portion is not heated sufficiently to cause adherence thereto of the materials deposited at 53. As a result, such materials can be drained from the cup with facility, through suitable drainage means.

A drainage connection 54 extends from the bottom of the cup 50 to a drain valve casing 55 adjacent the lower end thereof. A drain nozzle 56 extends from the lower end of this casing and opens into an outlet 57 thereof. A valve seat 58 is disposed about the outlet 57 and cooperates with a valve 59 for controlling opening 57. The valve includes a body 60 from which extend fins 61 which operate in suitable guides 62 in the casing 55. At its upper end the body 60 is provided with a disc 63 connecting the fins 61 and body 60, this disc being of a size to fit snugly in an opening defined by a shoulder 64 extending inwardly from casing 55.

I provide suitable means to prevent draining of the cup 50 and casing 55 and parts associated therewith when the drain tank 23 is not in proper position within compartment 22. Referring more particularly to Figs. 5, 17, 19 and 19A, a valve plate 65 is suitably mounted for swinging movement, at 66, upon the drain nozzle 56. This plate carries a hemispherical valve 66a adapted to fit into the discharge end of nozzle 56 so as to form a fluid tight closure therewith. The plate 65 is urged by a wire spring 67 in valve closing direction, so as to hold the valve 66 seated in the nozzle, thus closing the outlet thereof. A trip plate 68 is suitably hinged, at 69, upon partition 5 and extends downwardly through an opening 70 therein. This trip plate includes a trip finger 71 bent at an angle thereto and disposed to contact a cooperating portion of the valve plate 65. When the tank 23 is withdrawn from its compartment 22, the plate 68 occupies the full line position of Fig. 17 and valve 66a is in closed position, as shown. When the tank 23 is slid inwardly into its innermost position, the rearward wall of the tank contacts plate 68 so as to raise it, this upward movement of plate 68 causing the valve plate to be moved about pivot 66, by finger 71, so as to swing the valve downwardly into inoperative position. The relative positions of the plate 68 and the valve plate and associated parts, at this time, are indicated in dotted lines in Fig. 17. When the drain tank 23 is in proper position, the valve 66a is opened and, by opening the valve 59, the cup 50 and valve casing 55 and parts connected thereto can be drained into the tank. Normally, the valve 59 is in closed position and is opened only at such times as it is desired to drain the system.

Valve casing 55 is provided, adjacent its upper end, with a flange 73 suitably secured, as by means of screws (Fig. 3) to a flange 74 of top plate 28, this flange defining an opening 75 through which the upper portion of casing 55 extends. A sleeve or bushing 76 screws into the upper end of casing 55, the upper end of this bushing being closed by a head 77. A valve stem 78 is slidable through head 77 of the bushing and is secured, at its lower end, to disc 63 of the valve in a suitable manner, as by a pin 79. A knurled knob 80 is secured to the upper end of stem 78, by a pin 81. An expansion coil spring 82 is mounted within the bushing 76 and confined between head 77 thereof and a collar 83 secured to valve stem 78 by a dog-pointed screw 84. The head of this screw operates in a slot 85 of bushing 76. Referring more particularly to Fig. 18, this slot is provided at its upper end with an arm 86 extending circumferentially of the bushing and, at its lower end, with an arm 87 which is inclined downwardly from the slot. The spring 82 acts to hold the valve 59 seated and, by turning arm 80 in clockwise direction the head of screw 84 is moved into arm 87 of the slot and cooperates therewith for exerting a cam action to force the valve tightly onto its seat. To open the valve, knob 80 is turned in a counterclockwise direction to position the head of the screw in slot 85, the valve being then raised and the knob again turned in a counterclockwise direction so as to dispose the head of screw 84 in arm 86 of the slot. This holds the valve in open position for draining the system, it being assumed that the valve 66a is also in open position. By unscrewing the bushing 76 from valve casing 55, the entire valve assembly may be removed as a unit from the casing so as to permit of insertion of a bristle brush or other suitable device into the casing for cleaning the same.

Cup 50 of the water conditioner communicates with casing 55 by means of a supply connection 88. It is to be noted that this connection opens into the cup 50 above the heating device 52 and adjacent the upper end thereof. This assures that the more highly heated water will flow from the cup 50 into the valve casing 55, and prevent entry of calcium, magnesium and other materials of like nature into valve casing 55.

Valve casing 55 is provided with an outlet nipple 90 above and adjacent shoulder 64. This nipple receives a tube 91 screwed into the nipple, the other end of this tube being connected by a T connection 92 to a second tube 93. A nipple 94 screws into the stem of T connection 92. This nipple is provided at its upper end with an outer flange 95 against the under face of which bears a packing nut 96 which screws into a thimble 97. This thimble extends through the bottom of the dressing sterilizer tank 36, and is soldered or otherwise suitably secured to the bottom of this tank to form a fluid tight closure therewith. A gasket 98 is confined between flange 95 and an inwardly extending flange 99 of thimble 97, this gasket providing a fluid tight closure between the thimble and the nipple 94.

Tube 93 is connected to the instrument sterilizer tank 39 (Fig. 3) in the same manner as tube 91 is connected to the dressing sterilizer tank 36. A screw plug 100 closes the forward arm of the T connection 92 attached to the tank 39. By removing this screw plug, a bristle brush or other suitable device can be inserted with facility through the tubes 91 and 93 and the T's for cleaning the same. Also, the nipple 94 can be cleaned with facility by inserting a suitable cleaning device into the same from within the respective tanks. When the water container 44 is removed from the water reservoir, ready access is had to the water conditioner and associated connections for cleaning the same. It will thus be seen that the entire water supply and conditioning system can be cleaned and drained with facility, which is of considerable importance.

Normally the valve 66a is open and the valve 59 is closed, as in Fig. 17. With the water container 44 in position, the water level is automatically maintained in the water reservoir so long as any water remains in the container. The container 44 is of proper capacity to assure an adequate supply of water for a considerable length of time. When the container becomes empty, it can readily be replaced by a full container, or filled and replaced. The water from the reservoir flows into cup 50, through elbow 49, and through connection 88 into valve casing 55, from which it flows into the sterilizer tanks through the tubes 91 and 93 and associated nipples and connections. The water level in the sterilizer tanks corresponds to the water level in the reservoir and is automatically maintained by replenishing of the water in the reservoir from the container 44. The tanks of the respective sterilizers are so disposed, relative to the water reservoir, that the water line and the volume of water in each tank are such as to assure maximum efficiency in the sterilizing operation, the volume of water in each instance not being in excess of that required to assure proper sterilizing of the instruments or the dressings or other articles to be sterilized.

The dressing sterilizer includes an upper section 100a having a reduced lower portion 101 open at its lower end and which extends downwardly within tank 36 below the water level therein. The upper section is provided, adjacent its upper end, with an inwardly extending bead 102 upon which seats the upper end of an imperforate sheet metal container 103 disposed within section 100a, the container 103 being soldered or otherwise suitably secured to bead or rib 102 so as to form a fluid tight closure therewith. The container 103 receives a perforated basket 104, conveniently formed of sheet metal and provided with a suitable bail or handle 105. A cover 106 is suitably hinged, as at 107, to upper section 100a of the dressing sterilizer. Suitable means, to be later described, is provided for opening and closing the cover. With the cover in closed position, towels, dressings and other articles placed in the basket 104 may be subjected to the steam generated by heating of the water in tank 36 so as to be effectively sterilized.

Referring more particularly to Figs. 8 and 9, a sheet metal thimble 107 is suitably secured, as by soldering, through upper section 100a of the dressing sterilizer and through the container 103, at one end thereof. A cylindrical valve 108 is mounted for turning movement in the thimble 107. This valve is divided by a partition 109, of substantially L-shape in cross-section, into an inlet chamber 110 and an exhaust chamber 111. The valve is provided, through its circumferential wall, with two openings 112 and 113, which open into chambers 110 and 111, respectively. The thimble 107 is provided, at the lower portion thereof, with an opening 114 into the space 115 between container 103 and upper section 100a of the sterilizer. The steam generated in tank 36 and the lower portion 101 of upper section 100a of the sterilizer rises into the space 115. The valve 108 is provided with suitably disposed exhaust openings 116, extending through the outer end of the valve and opening into chamber 111. An operating handle 117 is secured to the outer end of the valve for operating the same, this handle cooperating with a flange 118 at the inner end of the valve for holding the valve against endwise movement. With the valve in the position illustrated in Fig. 8, the steam from space 115 flows into chamber 111 of the valve and thence through the openings 116 to atmosphere. By turning the valve into position to bring opening 112 into register with opening 114, the steam is admitted into container 103 about the basket 104. An outlet tube 119 is secured through section 100a of the sterilizer and through container 103, at the bottom thereof, and at the other end of the sterilizer. The steam which enters the space about the basket, flows through the perforations in the basket so as to thoroughly penetrate towels, dressings or other articles disposed within the basket, and escapes through the tube 119. The articles within the basket are thus thoroughly sterilized. After the sterilizing operation has been completed, the articles within the basket may be dried, after which the basket and the articles contained therein are removed from the sterilizer.

The cover 106 is provided with two openings 120 therethrough. These openings are controlled by a valve plate 121 mounted for turning movement upon the cover and provided with two openings 122 disposed to be moved into and out of register with the openings 120. An operating handle 123 is suitably connected to the valve for turning the same. When the valve 108 is in position to direct the steam into container 103 about the basket 104, the valve 121 is in position to cover the openings 120, as in Fig. 6. After the sterilizing operation has been completed, valve 108 is turned into the position of Fig. 8 and valve 121 is turned into position to bring the openings 122 thereof into register with openings 120 of the cover. With the valves disposed as stated, the steam flowing through the space 115 serves to heat the container 103 and the articles in the basket 104 so as to drive the moisture out of such articles and thoroughly dry them. The moisture driven off from the dressings or other articles in the basket escapes, in the form of steam or vapor, through the openings 120 of the cover. In this manner, the articles in the basket can be dried quickly and effectively, after which the cover 106 is moved into open position and the basket and the contents thereof are removed from the sterilizer.

Tank 39 of the instrument sterilizer is provided with a suitable cover 124 which is suitably hinged to the tank at 125. A bracket plate 126 is suitably secured to cover 124 at each end thereof, as by means of screws 127. This plate is pivotally secured at its lower end, at 128, to the upper end of a finger 129 extending from the rearward portion of a tray supporting member 130. This member 130 is provided, adjacent the front and the back thereof, with an angularly disposed and inwardly projecting element 131 of arcuate cross-section, the upper surface of such element being convexed. The elements 131 of the tray supporting members 130 at opposite ends of the tank 39 are adapted to support a perforated sheet metal instrument tray 132. Each of the supporting members 130 is pivotally secured, adjacent its forward end and at 134, to the forward end of a link 135, the rearward end of which is pivotally secured, at 136, to the adjacent end wall of tank 39. When the cover 124 is in the full line position of Fig. 7, that is, when the cover is closed, the members 130 are so disposed that the tray 132 and the instruments therein are completely immersed in the water within tank 39. Upon opening of the cover, the members 130 are raised so as to raise the tray 132 into the dotted line position of Fig. 7. During the opening and closing of cover 124, the tray supporting members 130 are maintained horizontal by the links 135. This causes slight forward and rearward movement of the members 130. Elements 131 of members 130, due to their arcuate formation, readily slide along the bottom of the tray 132 so as to accommodate forward and rearward movement of the members 130 in the event that the tray contacts either the front or the rear wall of tank 39.

I preferably provide means for operating the covers of the sterilizer. Since the means for operating the cover of dressing sterilizer is the same as the means for operating the cover of the instrument sterilizer, the description of the latter means will suffice. Referring more particularly to Figs. 1, 2, 5, 11 and 11a, a bracket 137 depends from the under face of top plate 28 and may conveniently be formed integral with this plate. A bracket plate 138 is suitably secured, as by means of screws 139, to bracket 137. A guide plate 140 is disposed within an opening through plate 138 and defines therewith a cam slot 141. Plate 140 is supported by a strip 142 secured to plate 138 by screws 143, or in any other suitable manner. Strip 142 straddles the cam slot 141 and is provided with inwardly offset elements 144 of U-shape and of proper width to accommodate the head 145 (Fig. 12) of a headed guide pin 146 which operates in cam slot 141. This pin is suitably secured in the lower end of a link 147 which is pivotally secured at its upper end, at 148, to a second link 149. Link 149 is pivotally secured, at its lower end, at 150, in a fork 151 of a lever 152 pivoted intermediate its ends upon a stud 153 projecting from bracket plate 138. The pivot 150 is preferably in the form of a screw to provide a removable connection between lever 152 and link 149. The other end of lever 152 is pivotally connected, by a pivot screw 154, to the upper end of a link 155, the lower end of which is pivotally connected, at 156, to an operating pedal 157 rockably mounted at 158 upon a suitable supporting element of base 4 of the cabinet. Preferably, each of the pedals 157 is provided with an upwardly and rearwardly extending arm 159 which is connected to a dash-pot 160 suitably mounted upon base 4. The dash-pot is of suitable type and is adapted to cushion upward movement of the pedal lever 157 so as to prevent violent closing of the sterilizer cover. The front wall 11 of the outer or main cabinet 1 is provided with a suitable opening 161 which accommodates the pedal levers 157, and these levers are preferably provided, at their outer ends, with rubber cushion elements 162 to cushion contact of the levers with the floor.

The upper end of link 149 is bent outwardly to provide an angularly disposed element 163 having an opening therethrough disposed in alignment with a lug 164 riveted to link 149 below element 163, this lug being suitably bored and threaded for reception of the lower threaded portion of link rod 165. The lower portion of this rod screws through the lug 164 and provides means for adjusting the effective length of the link structure composed of link 149 and rod 165. Rod 165 is provided at its upper end with an eye 166, which extends about a bearing element 167a of a bearing screw 167. Eye 166 is confined between enlarged head 167b of screw 167 and one face of an angle bracket 168 suitably secured to cover 124 of the instrument sterilizer. The screw is provided with a reduced and threaded shank 167c which screws into a suitable nut 168a adjacent the other face of bracket 168. This nut has a boss 168b which passes through the bracket and contacts element 167a so as to prevent binding of the bracket between eye 165 and nut 168a. A hand wheel 169, formed of suitable heat insulating material, preferably one of the condensation products, is mounted upon a stud 169a projecting from the other side of screw 167, and is secured thereon by means of a washer 169b and a screw 169c passing through the washer and screwing into stud 169a. By removing screw 167, the eye is detached from bracket 168 and the rod may then be turned for screwing it into or out of lug 164 to adjust the effective length of the link construction. The hand wheel 169 provides means for operating the cover manually when desired.

When cover 124 of the instrument sterilizer is in closed position, pin 146 is at the bottom of the cam slot 141 and slightly in advance of the lower point of guide plate 140. Upon depression of pedal lever 157, link member 149 is raised and, in conjunction with link rod 165, acts to raise or open the cover 124. Cam slot 141 is provided, at the upper end of the forward run thereof, with a shoulder 170, and guide plate 140 is provided with a corresponding depression 171 in its upper end. During the upward movement of link 149 in the opening of the cover, pin 146 travels along the forward run of the cam slot 141 and, when the cover is in full open position, contacts shoulder 170. Upon releasing pressure applied to the pedal 157 for opening the cover, the cover tends to close but, at this time, pin 146 drops downwardly out of contact with shoulder 170 and into depression 171 of plate 140. This serves to hold the cover in open position. When it is desired to close the cover, the pedal 157 is again depressed. In this connection, it is to be noted that, at this time, pin 146 is disposed in recess 171 and below the point of shoulder 170. As a result, when the pedal is depressed the second time, pin 146 passes rearwardly beyond the shoulder into the upper end of the rearward run of cam slot 141 and, when pressure is removed from pedal 157, the cover is closed by gravity, pin 146 traveling downwardly along the rearward run of the cam slot. Violent closing of the cover is avoided by provision of the dash-pot previously referred to. If desired, any suitable means may be provided to assure closing of the cover though, ordinarily, gravity may be depended upon for closing the cover, due to the weight thereof and the relation between the levers and links of the cover operating mechanism. The top plate 28 is provided with suitable openings 172 to accommodate the link rods 165.

I provide suitable means for heating the water in each of the sterilizer tanks. Preferably, each of the tanks is provided with two electrical heating elements 173 of known type. The element 173 is preferably thin and flat, and includes a resistance coil. These elements are held in close contact with the bottom of the tank by suitable clamping plates 174 which bear against the under faces of elements 173. These plates extend lengthwise of the tanks, as do the heating elements, and each plate is provided, adjacent each end thereof, with a boss 175 having a depression therein for reception of the point of a pressure screw 176. Screws 176 thread through pressure bars 177 the ends of which rest upon upturned flanges of supporting strips 178 welded or otherwise suitably secured to the front and the back walls of the tanks adjacent each end thereof. The bars 177 are preferably of channel cross-section to impart rigidity thereto. This manner of mounting the clamping plates 174 is advantageous as permitting rocking of such plates to accommodate disposition of the heating elements 173 so that such elements are held firmly against the bottom of the tanks. A tank securing strap, in the form of a double U, designated 179, is suitably secured to lugs 180 depending from cover plate 28. The bight portions of this strap are suitably secured, as by means of screws 181, to bars 177. There are two of these straps, one adjacent each end of the respective tanks. This provides means for anchoring the tanks to the cover plate in such manner as to effectively prevent upward movement thereof due to opening of the covers of the sterilizers. In order that the upper section 100a of the dressing sterilizer may not move upwardly upon opening of the cover 106, I provide suitable means for securing the same to the cover plate. This means comprises a swing-bolt 182 suitably anchored to the cover plate and cooperating with a slotted bracket 183 secured to each end of section 100a this bolt carrying a thumb nut 184 thereon. Any other suitable or preferred means may be employed for holding the section 100a of the sterilizer for dressings and the like against upward movement.

Figure 4:
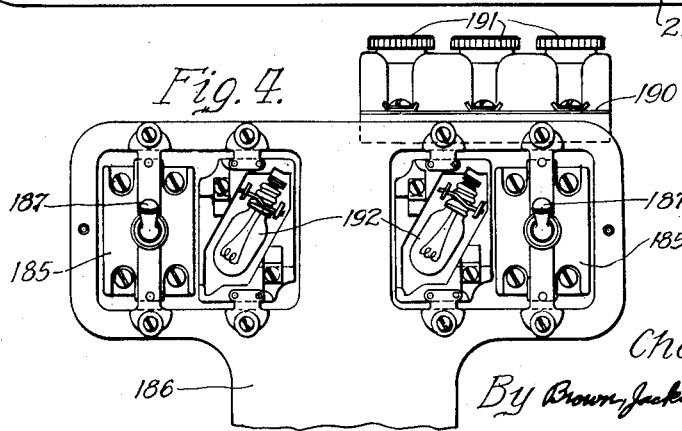
Figure 4 is a detail of the control switches and associated parts, this view being taken substantially on line 4—4 of Figure 3.

Suitable switches are provided for controlling the circuits of the heating elements 173 and the circuit of the heating device 52 of the water conditioner. Two switches 185 of known type are suitably mounted upon a supporting bracket 186 secured to and depending from top plate 28. Each of these switches has a control lever 187 which extends through a suitable opening in a plate 188 which forms a closure for an opening 189 through front wall 11 of the outer cabinet 1. The bracket 186 also supports a fuse block 190 suitably secured thereto and adapted for reception of fuses 191 for controlling the several circuits. These fuses are of known type and are so disposed as to be readily accessible from within the inner cabinet, by opening the upper door thereof, an opening being provided through partition 5 to accommodate the fuses and the lower portion of the fuse block. Referring more particularly to Fig. 4, each of the switches 185 has associated therewith a pilot light 192 for indicating the condition of the circuit controlled by such switch, in a known manner. An outlet box 193 of known type is suitably secured to the upper face of partition 5 and is adapted for reception of a plug cap 194 from which extends a cord 195 having suitable connection to the switches. The outlet block 193 is connected in a suitable manner to a control switch which is automatically operated and is connected, in turn, to the main line by a cord 196 passing through an insulating thimble 197 which is secured through the back wall of the main cabinet 1. Cord 196 is connected to the house or office circuit by any suitable means, as by means of a plug cap similar to cap 194 and well known in the art.

Figure 14:
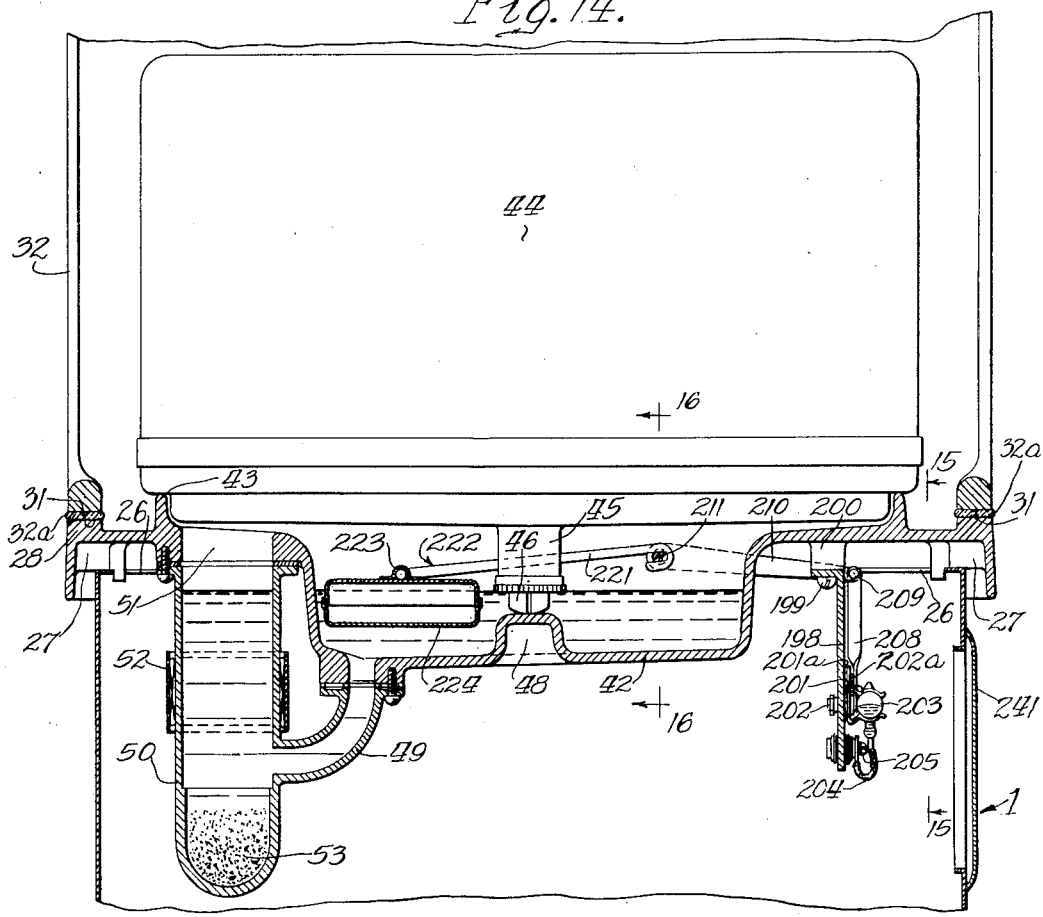
Figure 14 is a section taken substantially on line 14—14 of Figure 5.
Figure 15:
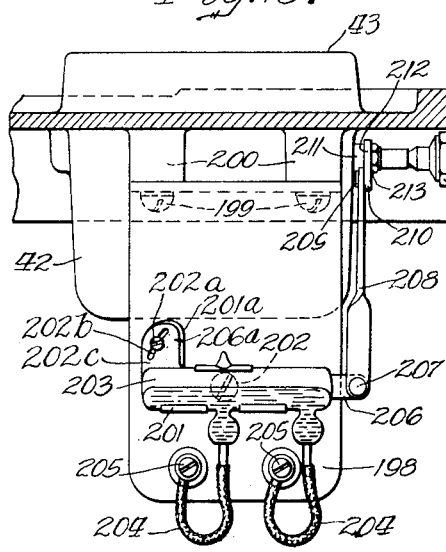
Figure 15 is a section taken substantially on line 15—15 of Figure 14.
Figure 16:
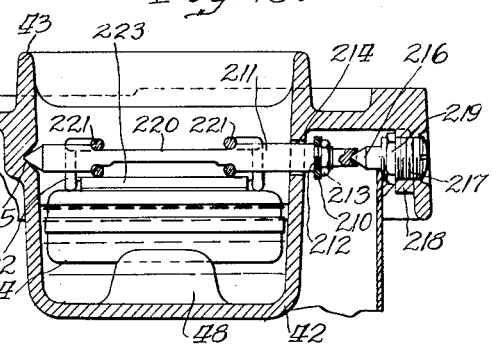
Figure 16 is a section taken substantially on line 16—16 of Figure 14, the water container being omitted.

The automatic control switch and the method of operating the same is illustrated more clearly in Figs. 14 to 16. An angle bracket 198 is suitably secured, as by means of screws 199, to bosses 200 depending from the water reservoir 42. A switch holding member 201, in the form of a spring clip, is pivotally mounted upon bracket 198 by means of a pivot pin 202. A mercury tube switch 203, of known type, is mounted in the holder 201 and flexible leads 204 connect the terminals of this switch to connecting screws 205 suitably mounted upon and insulated from the bracket 198. A holder plate 201a is also pivoted upon pin 202 and is provided with a finger 206 the outer end of which is pivotally connected, at 207, to the lower end of a link 208 pivoted at its upper end, at 209, to one end of an arm 210. This arm is mounted upon a shaft 211 and is clamped between a shoulder 212 of this shaft and a nut 213 screwing onto the shaft from one end thereof. Plate 201a is provided, at its other end, with an upwardly extending arm 206a into which threads a clamping screw 202a. Screw 202a passes through a slot 202b in an arm 202c extending upwardly from clip 201, which slot is concentric with pivot pin 202. This provides means for setting the mercury switch by adjusting the angular relation between clip 201 and plate 201a. The mercury switch is connected in series in the positive side of the line so that, when this switch is open, the circuit is broken and no current can flow to any of the heating devices.

Shaft 211 extends through an opening 214 through one side of water reservoir 42 and above the water level therein. The inner end of this shaft is rockably mounted in a needle point bearing 215 and the outer end of this shaft is provided with a conical recess which receives a needle point bearing 216 carried by a screw plug 217 which screws through a boss 218 formed upon the depending flange at the back of the top plate 28. This plug is secured in adjustment by a jam nut 219. The shaft 211 is thus supported for rocking movement on a horizontal axis. The central portion of shaft 211 is cut away to provide a flattened element 220. The end portions of arms 221, of a U-shaped member 222, conveniently formed from a suitable length of wire, are bent over and secured tightly about flattened element 220 of the shaft adjacent the ends of such element. The bight portion of member 222 passes through a tubular member 223 suitably secured to the top of a hollow sheet metal float 224 partially immersed in the water in reservoir 42. When the water in the reservoir is at the proper level therein, the float 224 is held raised and acts, through the shaft 211 and associated parts, to hold the mercury tube 203 in horizontal position, as in Fig. 15, maintaining the main circuit closed for supplying current to the several heating devices. If the water in either of the sterilizing tanks drops appreciably below the proper operating level, there is a corresponding drop in the level of the water in reservoir 42. This results in lowering of float 224 so that the shaft 211 is rocked in a counterclockwise direction as considered in Fig. 14. As a result of this rocking movement of the shaft, the right hand end of the mercury tube switch, as considered in Fig. 15, is raised to such an extent as to open the circuit through this switch. When this occurs, the circuit to the several heating devices is opened thus disabling such devices. This provides an automatic control whereby heating of the sterilizer tanks or of the water conditioner is prevented when the water supply is such that the level in the tanks falls appreciably below the proper operating level, and injury to the tanks or the conditioner due to heating thereof when empty, or substantially so, is eliminated.

Each of the sterilizer tanks is provided, at one end thereof, with a thermostat 225 of any suitable or preferred type. This thermostat is mounted in a cup-shaped casing 226 suitably secured through the end wall of the tank. Referring more particularly to Figs. 5 and 8, the lower reduced portion 101 of upper section 100a of the dressing sterilizer is provided, in one end thereof, with a cup-shaped depression 227 to accommodate the upper portion of casing 226 of the thermostat 225. As will be noted more clearly from Fig. 5, the thermostat is disposed so as to extend well below the water level in tank 36 so that this thermostat is controlled by the temperature of the water in this tank. The thermostat of tank 39 of the instrument sterilizer is similarly disposed, as will be clear by reference to Fig. 7. The thermostat is disposed in the circuit of one of the heating elements of the tank with which such thermostat is associated, and acts to open the circuit of this heating element when the water in the tank reaches a temperature of boiling or slightly greater. Upon closing of the switch controlling the heating elements of the tank, assuming that the mercury control switch is closed and there is a sufficient amount of water in the tanks, both of the heating elements for the tank are brought into operation and serve to raise the water therein quickly to boiling temperature or slightly above. When this temperature is reached, the thermostat opens so as to disable one of the heating elements, the circuit remaining closed as to the other heating element so as to maintain the water at approximately the desired temperature for the sterilizing operation. If the temperature of the water drops to approximately 200° F., the thermostat again closes and the two heating elements quickly raise the temperature of the water as previously described. This gives an automatic control for maintaining the water in the tank at proper sterilizing temperature while avoiding violent boiling of the water and resultant wastage of electrical energy.

The circuits for the several heating devices are so arranged that, upon closing of either of the switches 185, the circuit of the heating device 52 of the water conditioner is closed as well as the circuit of the heating devices of the sterilizer tank controlled by such switch. This assures that the water will be properly presterilized and conditioned preliminary to use thereof in either of the sterilizing tanks. This presterilizing of the water is important as assuring proper sterilizing of the instruments and the towels, dressings, or other articles. If the water were not presterilized, there would be the danger that germs would enter the sterilizing tanks with the relatively cold water immediately prior to removal of the instruments or other articles from the tanks, and these germs would lodge upon such articles and, quite possibly, would not be completely destroyed before removal thereof from the tanks. I eliminate this possibility by presterilizing the water in the water conditioner, as previously described.

Figure 20:
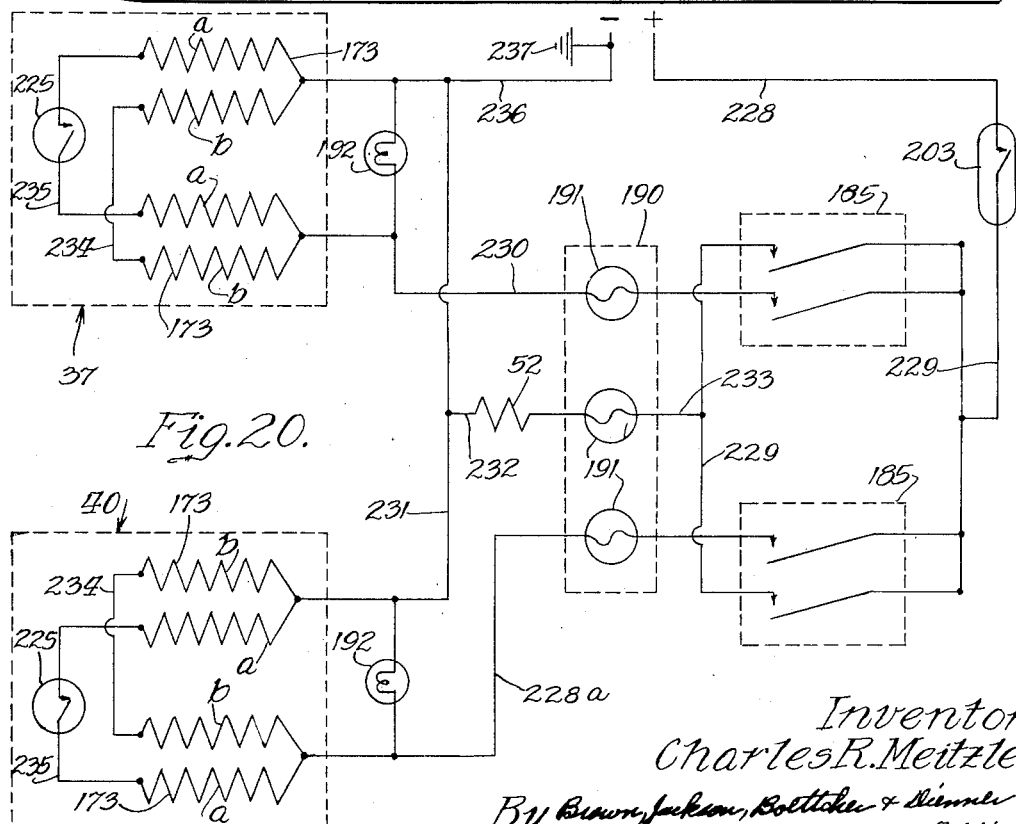
Figure 20 is a diagram of the connections for the heating elements and the control means therefor.

In Fig. 20 I have illustrated the diagram of connections for the several heating devices. The mercury switch 203 is connected in series with the positive main 228, and is connected by lead 229 to the switches 185, which are of known type, these switches being double pole switches. Each of the heating elements 173 includes two resistance elements "a" and "b". One pole of the instrument sterilizer switch is connected by a lead 228a to the resistance elements "a" and "b" of one of the heating elements 173 of the instrument sterilizer, these resistances being connected in parallel. The other pole of the instrument sterilizer switch is connected by a lead 229 to one pole of the dressing sterilizer switch, the other pole of which is connected by a lead 230 to one pair of the resistances "a" and "b" of the dressing sterilizer heating element, such resistances being connected in parallel. The resistances "a" and "b" of the other heating element of the instrument sterilizer, are connected by a lead 231 to the resistances of the corresponding heating element of the dressing sterilizer, these resistances in each instance being connected in parallel. Lead 231 is connected by a short lead 232 to heating element 52 of the water conditioner, the other terminal of element 52 being connected by a lead 233 to lead 229. The resistance elements "b" of the heating element 173 of the respective sterilizers are connected in series by a lead 234. The resistance elements "a" of the heating elements of the respective sterilizers are similarly connected by a lead 235 in which is interposed the thermostat 225. The negative main 236 is connected to lead 231, and is preferably grounded at 237. The pilot lights 192 are shunted across the heating elements 173 of the respective sterilizers, as shown. The fuses 191 are interposed in the respective circuits, as illustrated.

Under normal conditions, the mercury switch 203 is closed. With the mercury switch closed, if either of the switches 185 be closed, current is supplied to the heating elements of the corresponding sterilizer and also to the heating element 52 of the water conditioner. When the water in this sterilizer reaches a predetermined maximum temperature, the thermostat 225 opens so as to open the circuit through resistance element "a" of the two heating elements 173. The circuit remains closed, however, through the resistance elements "b", and such elements serve to maintain the water in the sterilizer tank at proper sterilizing temperature. In the event of an appreciable drop in temperature of the water, the thermostat 225 closes again bringing the resistance elements "a" into operation for raising the water to boiling temperature or slightly higher. In the event that the water in the tank is below the proper level and is at the predetermined low level, the mercury switch 203 is opened in the manner described above. In this event, no current will flow to any of the heating devices even though the switches 185 be closed. This prevents damage to the apparatus due to heating thereof when there is an insufficient supply of water, as previously set forth. If it is desired to use both of the sterilizers simultaneously, both of the switches 185 are closed. With both switches closed, the water in the respective sterilizer tanks and in the cup of the conditioner, is heated, and the thermostats 225 operates to maintain the water in the respective tanks at proper sterilizing temperature, the automatic control of the heating elements of the respective tanks being independent.

The top plate 28 and the associated sterilizing apparatus may be removed as a unit from the main cabinet 1 for inspection and repair, or other purposes. To permit of this being done, it is only necessary to pull the plug cap 194 out of the outlet block 193, and to disconnect the levers 152 from the links 155. The main cabinet 1 is provided with suitably disposed openings 238, 239 and 240 through one side and adjacent the top thereof, such openings giving ready access to the levers 152 and the upper ends of links 155, as well as to the plug cap 194 and the mercury switch. These openings are normally closed by a cover plate 241 releasably secured in position by screws 242, or any other suitable manner. By removing this cover plate, ready access is had to screws 154 connecting the links 155 to levers 152. By removing these screws 154, and pulling the plug cap 194 out of the outlet block 193, top plate 28 and the sterilizing apparatus carried thereby may be removed as a unit from the cabinet. The opening 240 gives access to the mercury switch for adjusting the same and for disconnecting main 228 from this switch preliminary to removal of the sterilizing apparatus from the cabinet. The legs 34 serve to support the top plate and the associated sterilizing apparatus, when removed from the cabinet, so as to give ready access thereto as previously described. The top plate is preferably provided with a drain opening 243 disposed to drain into the waste or drain tank the water of condensation which collects upon this plate and the bracket shelf 32, in the operation of the sterilizer.

Preferably, I mount the sterilizing apparatus in a cabinet constructed in the manner illustrated and described above. This is not essential, however, and the sterilizing apparatus may be supported in any other suitable or preferred manner. I contemplate providing a casing of suitable type for enclosing the sterilizing apparatus, suitable means being provided for operating the levers 152 for opening and closing the covers. As indicated, and as will be understood by those skilled in the art, changes in construction and arrangement of parts of my invention may be resorted to without departing from the field and scope of the same, and I intend to include all such variations, as fall within the scope of the appended claims, in this application in which the preferred form only of my invention is disclosed.

What I claim is:

1. In sterilizing means, a sterilizing tank, means for supplying water to the tank, said supplying means including means for heating the water, and means for heating the water in the tank.

2. In sterilizing means, a sterilizing tank, a water conditioner including a receptacle communicating at a point remote from its bottom with the tank, means for heating water in the receptacle and remote from the bottom thereof, and means for heating water in the tank.

3. In sterilizing means, a sterilizing tank, a water conditioner including a receptacle communicating at a point remote from its bottom with the tank, means for supplying water to said receptacle and to the tank at a predetermined level therein, means at the upper portion of the receptacle for heating the water therein, and means for heating the water in the tank.

4. In sterilizing means, a water reservoir, a receptable communicating at a point remote from its bottom with the reservoir, a drain valve casing communicating with said receptacle at the bottom thereof and having a drain outlet opening, a valve controlling said opening, a sterilizer tank communicating with the casing above said valve, means for heating the water in the receptacle remote from the bottom thereof, and means for heating the water in said tank.

5. In sterilizing means, a water reservoir tank, means for supplying water to the tank at a constant level including a water supply container seating upon the tank, a receptacle opening into the tank and communicating therewith at a point remote from the bottom of said receptacle, a drain valve casing communicating with the receptacle at a point remote from the bottom thereof, said casing having a drain nozzle and the receptacle having a drain connection from the bottom thereof to the nozzle, a valve in the casing and controlling communication between the same and the nozzle, a sterilizer tank communicating with the casing above said valve, means for heating water in the upper part of the receptacle, and means for heating water in the sterilizer tank.

6. In sterilizing means, a water reservoir tank, means for supplying water to the tank at a constant level including a water supply container seating upon the tank, a receptacle opening into the tank and communicating therewith at a point remote from the bottom of said receptacle, a drain valve casing communicating with the receptacle at a point remote from the bottom thereof, said casing having a drain nozzle and the receptacle having a drain connection from the bottom thereof to the casing, a valve in the casing and controlling communication between the same and the nozzle, a drain tank positionable beneath the nozzle outlet, means controlled by the positioning of the drain tank for closing the nozzle outlet when the drain tank is removed and opening the nozzle outlet when the tank is in proper position, a sterilizer tank communicating with the casing above said valve, means for heating water in the upper part of the receptacle, and means for heating water in the sterilizer tank.

7. In sterilizing means, a sterilizing tank, means for automatically supplying water to the tank and cutting off the water supply when the water reaches a predetermined high level in the tank for maintaining the volume of water in the tank substantially constant, heating means of proper capacity for normally maintaining the constant volume of water in the tank at a predetermined low temperature, and supplemental heating means automatically rendered active or inactive, said supplemental means being operative conjointly with said heating means and of proper capacity to increase the temperature of the constant volume of water in the tank to an appreciable extent within a relatively short time when rendered active.

8. In sterilizing means, a sterilizing tank, means for automatically supplying water to the tank and cutting off the water supply when the water reaches a predetermined high level in the tank for maintaining the volume of water in the tank substantially constant, normally active heating means of proper capacity for normally maintaining the constant volume of water in the tank at a predetermined low temperature, and automatic supplemental heating means operative conjointly with said heating means and controlled by the temperature of the water in the tank and of proper capacity to increase the temperature of the constant volume of water in the tank to an appreciable extent within a relatively short time.

9. In combination, a sterilizer comprising a tank and a cover hinged thereto, a lever, and means for alternately opening and closing the cover in accordance with alternate movements of the lever on its fulcrum and in the same direction in the plane of movement of the lever.

10. In combination, a sterilizer comprising a tank and a cover hinged thereto, an operating lever, a second lever, a link connecting one end of the operating lever to one end of the second lever, a link connection between the other end of said second lever to the cover, the second lever being fulcrumed between its ends, a cam plate having a cam slot, and a member carried by said link connection and cooperating with the wall of the slot to alternately open and close the cover in accordance with alternate movements of the operating lever on its fulcrum and in the same direction.

11. In combination, a sterilizer comprising a tank and a cover hinged thereto, an operating lever, a linkage connection between the lever and the cover for opening and closing the latter, a cam member, and a member connected to said linkage and cooperating with said cam member for opening the cover when the lever is moved in one direction and holding the cover open and for releasing the cover for closing in the operation of said lever in said one direction.

12. In combination, a sterilizer comprising a tank and a cover hinged thereto, an operating lever, a link structure connecting the lever and the cover for opening and closing the latter, means for adjusting the effective length of said structure, a cam member, a link connected to said link structure, and a member carried by the link and cooperating with the cam member for holding the cover open and for releasing the cover for closing in the operation of said lever.

13. In sterilizing means, a sterilizing tank, means for heating water in said tank, means comprising a receptacle communicating with said tank for supplying water to said tank at a rate to compensate for removal and evaporation of water from said tank, and means for heating and thereby sterilizing the water in said receptacle prior to the flow of the water from the receptacle into said tank.

CHARLES R. MEITZLER.